(No Model.)
2 Sheets—Sheet 1.
G. W. McVAY.
HORSE POWER.
No. 261,373.
Patented July 18, 1882.
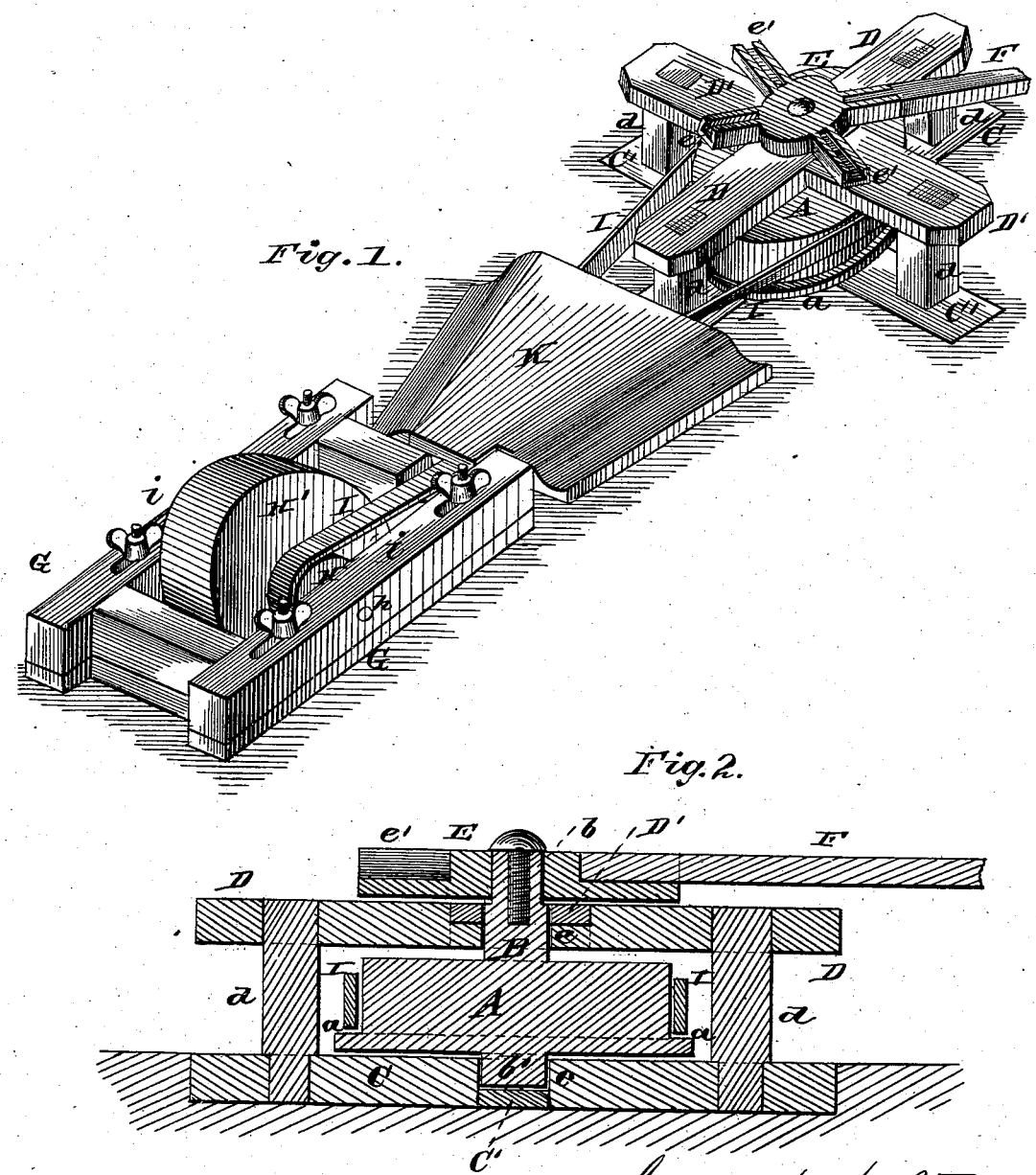

(No Model.)

G. W. McVAY.
HORSE POWER.

No. 261,373.

2 Sheets—Sheet 2.

Patented July 18, 1882.

WITNESSES:
Fred. G. Dieterich
P. C. Dieterich

George W. McVay
INVENTOR.
by Louis Bagger & Co.
ATTORNEYS.

UNITED STATES PATENT OFFICE.

GEORGE W. McVAY, OF WADESVILLE, WEST VIRGINIA.

HORSE-POWER.

SPECIFICATION forming part of Letters Patent No. 261,373, dated July 18, 1882.

Application filed May 22, 1882. (No model.)

*To all whom it may concern:*

Be it known that I, GEORGE W. McVAY, of Wadesville, in the county of Wood and State of West Virginia, have invented certain new and useful Improvements in Horse-Powers; and I do hereby declare that the following is a full, clear, and exact description of the invention, which will enable others skilled in the art to which it appertains to make and use the same, reference being had to the accompanying drawings, which form a part of this specification, and in which—

Figure 3:
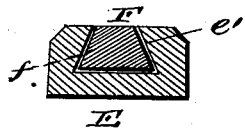
Figure 4:
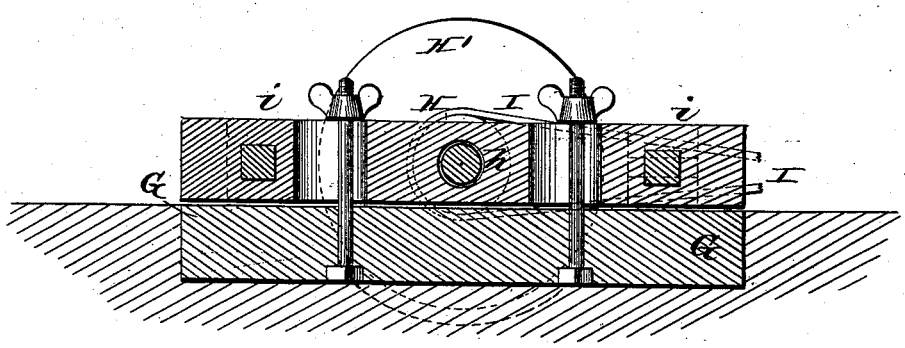
Figure 5:
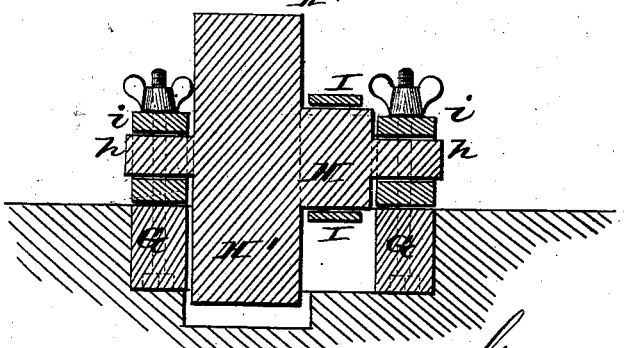

Figure 1 is a perspective view of my improved horse-power. Fig. 2 is a diametrical section through the master-wheel and its bearings. Fig. 3 is a cross-section through one of the arms of the spider. Fig. 4 is a longitudinal section of the pulley-frame or carriage with its appurtenances, and Fig. 5 is a vertical transverse section of the same.

Similar letters of reference indicate corresponding parts in all the figures.

My invention has relation to portable horse-powers for operating thrashing-machines and other agricultural implements or machinery; and it consists in the detailed construction and combination of parts of a power employing pulleys and endless bands instead of the cog-wheels and gearing which usually compose this class of machinery.

By my improved construction I produce a machine which can be easily taken apart for transportation from one place to another, which is very light, so as to require only a team of two horses in transporting it, and which will at the same time operate easily, with a minimum of friction and without appreciable back action.

The master-wheel of my improved horse-power is shown at A, and consists simply of a horizontal drum or pulley having a circumferential rim or flange, $a$, at its lower edge. It has a fixed central shaft, B, which is squared at its top part, $b$. This master-wheel is mounted in a frame which is composed of two bottom sills, C and C', mortised into each other at right angles and having a central recessed box, $c$, adapted to receive the gudgeon $b'$ at the lower end of shaft B. The top part of the frame is composed of a cross, D D', which is supported upon uprights $d$ $d$ of the ground-sill C C', and has a central bore or aperture, $e$, through which the top of shaft B is inserted. The squared portion $b$ of the shaft projects up over the frame and receives the detachable spider E, the arms of which have dovetailed slots $e'$, adapted to receive the dovetailed tenons $f$ of the detachable lever-arms F. The several parts C C', D D', $d$, and E may be taken apart and the master-wheel unshipped, when the whole may be packed so as to occupy but very little room in storage or transportation.

The second part of the power consists of the pulley-frame G, which carries the horizontal pulley-shaft $h$ and pulleys H and H'. An endless band, preferably a six-inch belt of leather or rubber belting of any approved manufacture, (shown at I,) connects the master-wheel A with the small pulley H, and passes through boxes K in the tread or path of the horses, so that they may easily step over it; or, if preferred, a low bridge may be constructed over the belt at this point, having a gentle rise on each side. The pulley-shaft $h$ is journaled in sliding and adjustable boxes $i$ $i$ in frame G, by the adjustment of which the belt may be tightened to take up slack, when required, without disturbing either of the frames or the belt itself, and this adjustment may be effected while the machine is in motion. Another belt (not shown in the drawings) passes from the large pulley H' to the drive-pulley of the thrasher or other machine to be operated by the power.

To use the machine the frame of the master-wheel is put together and anchored in or upon the ground, the belt is shipped, and the pulley-frame G is anchored at a suitable distance from the master-wheel, all of which will clearly appear by reference to Fig. 1 of the drawings without further explanation.

Having thus described my invention, I claim and desire to secure by Letters Patent of the United States—

1. In a horse-power of the described class, the separable frame composed of the cross-shaped ground-sill C C', uprights $d$, upper cross, D D', horizontal drum A, having bottom flange, $a$, and central shaft, B, having squared top part, $b$, and bottom gudgeon, $b'$, and spider E, the whole constructed and combined in the manner and for the purpose herein shown and specified.

2. In a horse-power of the described class, the horizontal pulley-frame G, having adjustable sliding boxes $i\ i$ and shaft $h$, upon which are fixed the pulleys H and H', as and for the purpose herein shown and described.

3. The combination, in a horse-power machine, of the following elements, viz: the ground-sill composed of the detachable sill-beams C C', crossing each other at right angles, uprights $d$, top cross composed of the separable arms D and D', horizontal pulley or master-wheel A, having bottom flange, $a$, and central shaft, B, spider E, having detachable lever-arms F, endless band or belt I, pulley-carriage G, having adjustable sliding boxes $i$, and shaft $h$, provided with the fixed pulleys H and H', the whole constructed, combined, and arranged substantially in the manner and for the purpose herein shown and specified.

In testimony that I claim the foregoing as my own I have hereunto affixed my signature in presence of two witnesses.

GEORGE W. McVAY.

Witnesses:
   ALBERT I. WHITE,
   JOSHUA M. TUSTIN.